(12) United States Patent
Kim et al.

(10) Patent No.: US 10,441,494 B2
(45) Date of Patent: Oct. 15, 2019

(54) ROUTE GUIDANCE METHOD AND APPARATUS FOR VISUALLY IMPAIRED USING VISIBLE LIGHT COMMUNICATION INSIDE SUBWAY STATION

(71) Applicant: YUYANG DNU CO., LTD., Hwaseong-si, Gyeonggi-do (KR)

(72) Inventors: Sangok Kim, Seoul (KR); Byungoh Kim, Suwon-si (KR); Dongsik Kim, Hwaseong-si (KR)

(73) Assignee: YUYANG DNU CO., LTD (KR)

( * ) Notice: Subject to any disclaimer, the term of this patent is extended or adjusted under 35 U.S.C. 154(b) by 255 days.

(21) Appl. No.: 15/510,958

(22) PCT Filed: Sep. 17, 2014

(86) PCT No.: PCT/KR2014/008649
§ 371 (c)(1),
(2) Date: Mar. 13, 2017

(87) PCT Pub. No.: WO2016/043357
PCT Pub. Date: Mar. 24, 2016

(65) Prior Publication Data
US 2017/0258666 A1    Sep. 14, 2017

(30) Foreign Application Priority Data
Sep. 15, 2014  (KR) .......................... 10-2014-0122283

(51) Int. Cl.
*G01C 21/00*  (2006.01)
*A61H 3/06*   (2006.01)
(Continued)

(52) U.S. Cl.
CPC ............. *A61H 3/061* (2013.01); *G01C 21/20* (2013.01); *G01C 21/206* (2013.01);
(Continued)

(58) Field of Classification Search
None
See application file for complete search history.

(56) References Cited

U.S. PATENT DOCUMENTS 7,970,537 B2    6/2011  Ann et al.
9,228,840 B2 *  1/2016  Bae .......................... G01S 19/48
(Continued)

FOREIGN PATENT DOCUMENTS

KR    10-2007-0060610 A    6/2007
KR    10-2008-0100093 A    11/2008
(Continued)

OTHER PUBLICATIONS

International Search Report (in English and Korean) and Written Opinion (in Korean) of the International Searching Authority for PCT/KR2014/008649, ISA/KR, Daejeon, dated May 14, 2015.

*Primary Examiner* — Truc M Do
(74) *Attorney, Agent, or Firm* — Harness, Dickey & Pierce, P.L.C.

(57) ABSTRACT

Some embodiments of the present disclosure relate to a method and an apparatus for providing a visually impaired a route guidance in a subway station by selectively providing the visually impaired at least one of guidance information received from a visible light illumination device installed in the subway station or information on a recommended route from the subway station to a destination and pre-stored route history information, thus informing the visually impaired as needed in a more efficient manner and enabling the visually impaired to arrive at the destination with safety.

12 Claims, 6 Drawing Sheets

(51) Int. Cl.
  *G01C 21/34* (2006.01)
  *G01C 21/36* (2006.01)
  *G08B 7/06* (2006.01)
  *G01C 21/20* (2006.01)

(52) U.S. Cl.
  CPC ..... *G01C 21/3484* (2013.01); *G01C 21/3617* (2013.01); *G01C 21/3641* (2013.01); *G08B 7/066* (2013.01); *A61H 2003/063* (2013.01); *A61H 2201/1604* (2013.01); *A61H 2201/165* (2013.01); *A61H 2201/5092* (2013.01); *A61H 2201/5097* (2013.01); *G01C 21/3629* (2013.01); *G01C 21/3652* (2013.01); *G01C 21/3661* (2013.01)

(56) References Cited

U.S. PATENT DOCUMENTS

| | | | |
|---|---|---|---|
| 2003/0037720 A1* | 2/2003 | Stockton | A61H 3/066 116/205 |
| 2008/0243331 A1* | 10/2008 | Kato | B60L 50/16 701/29.5 |
| 2008/0281515 A1* | 11/2008 | Ann | G01C 21/20 701/434 |
| 2009/0100031 A1* | 4/2009 | Gilligan | G06F 16/29 |
| 2009/0157309 A1* | 6/2009 | Won | G01C 21/20 701/533 |
| 2009/0171571 A1* | 7/2009 | Son | G01C 21/20 701/532 |
| 2009/0171572 A1* | 7/2009 | Alteresco | G08G 1/005 701/533 |
| 2009/0247151 A1* | 10/2009 | Kameyama | H04L 67/22 455/426.1 |
| 2012/0062357 A1* | 3/2012 | Slamka | G01C 21/20 340/4.11 |
| 2015/0372753 A1* | 12/2015 | Jovicic | H04B 10/116 398/172 |
| 2016/0248505 A1* | 8/2016 | Cha | H04B 10/116 |

FOREIGN PATENT DOCUMENTS

| | | |
|---|---|---|
| KR | 10-2013-0097037 A | 9/2013 |
| KR | 10-2013-0113195 A | 10/2013 |
| KR | 10-1337199 B1 | 12/2013 |

* cited by examiner

ROUTE GUIDANCE METHOD AND APPARATUS FOR VISUALLY IMPAIRED USING VISIBLE LIGHT COMMUNICATION INSIDE SUBWAY STATION

CROSS REFERENCE TO RELATED APPLICATIONS

This application is a U.S. National Phase Applications under 35 U.S.C. 371 of International Application No. PCT/KR2014/008649 filed on Sep. 17, 2014 and published in Korean as WO 2016/043357 A1 on Mar. 24, 2016. This application is based on and claims the benefit of priority from Korean Patent Application No. 10-2014-0122283 filed Sep. 15, 2014. The entire disclosures of all of the above applications are incorporated herein by reference.

TECHNICAL FIELD

The present disclosure in some embodiments relates to a metro station route guidance method and apparatus for vision impaired persons by using visible light communication.

BACKGROUND

The statements in this section merely provide background information related to the present disclosure and do not necessarily constitute prior art.

A vision impaired person can walk on the street or move to places with a cane while detecting obstacles ahead in the moving direction. Despite tactile paving of directional blocks on the ground or on the street, the vision impaired often fails to detect some incidents that might suddenly occur while moving. Recent efforts to address the sufferings have developed into technologies including utilizing the GPS technology as in the car navigation for tracking and providing a pedestrian's position and his or her travel route. However, indoor environments such as a subway or metro station provide degraded signal sensitivity to obscure the position tracking as ever.

A new alternative solution to these shortcomings proposes a route guidance service based on a visible light communication or simply visible communication scheme utilizing indoor illumination devices. In the case of route guidance service of the visible wireless communication scheme, a visible wireless communication illumination transmission device is installed on the ceiling or on a wall fixture to provide information to a receiver carried by a vision impaired via the visible wireless communication, and the receiver receives the information and provides a guidance with positional information or a travel route based on the received information. However, a conventional receiver merely relays the information as received from the visible wireless communication illumination transmission device to the vision impaired, which requires the vision impaired to listen to all the information guided in order to obtain desired information. Further, the difficulty may be aggravated by repeated visits to the same place by the vision impaired who comes to lose concentration, when a serious accident often occurs.

DISCLOSURE

Technical Problem

Therefore, the present disclosure has been made in an effort to effectively resolving the above-mentioned problems, and it is an object of the present disclosure to provide route guidance method and apparatus for the visually impaired for selectively providing at least one of recommended route starting from a subway station and ending at a destination or guidance information to a visually impaired based on guidance information received from a visible light illumination device installed in the subway station and pre-stored route history information, thus providing the visually impaired with information actually needed by the visually impaired in an efficient manner, and at the same time, for aiding the visually impaired to safely arrive at the destination.

SUMMARY

According to some embodiments of the present disclosure, an apparatus for guiding a visually impaired in a subway station by using a visible light communication includes a reception unit configured to receive an optical signal from a visible light illumination device installed in the subway station and to extract guidance information included in the optical signal, a storage unit configured to store route history information, and an analysis unit configured to provide at least one of the guidance information or a recommended route from the subway station to a destination based on the guidance information and the route history information.

According to some embodiments of the present disclosure, an apparatus for generating route history information for guiding a route to a visually impaired in a subway station includes a communication unit configured to receive an optical signal including guidance information from a plurality of visible light illumination devices installed in the subway station, and a computing unit configured to generate a travel route for each of subway stations based on the guidance information and an interval between communications with the plurality of visible light illumination devices and to generate the route history information by summing the respective travel routes for the subway stations.

According to some embodiments of the present disclosure, a method of guiding a visually impaired in a subway station by an apparatus for guiding the visually impaired by using a visible light communication, includes receiving an optical signal from a visible light illumination device installed in the subway station and extracting guidance information from the optical signal, and providing at least one of the guidance information or a recommended route from the subway station to a destination based on the guidance information and pre-stored route history information.

According to some embodiments of the present disclosure, a method of generating, performed by an apparatus for generating a route history information, the route history information for providing a visually impaired a route guidance in a subway station, includes receiving an optical signal including guidance information from a plurality of visible light illumination devices installed in the subway station, generating a travel route for each of subway stations based on the guidance information and an interval between communications with the plurality of visible light illumination devices, and generating the route history information by summing respective travel routes for the subway stations.

Advantageous Effects

According to some embodiments of the present disclosure, by selectively providing a visually impaired at least one of guidance information received from a visible light illumination device installed in the subway station or information on a recommended route from a subway station to a destination based on the guidance information and pre-stored route history information, the visually impaired is informed as actually needed in an efficient manner, and at the same time, can arrive at the destination with safety.

Further, according to some embodiments of the present disclosure, as the route guidance method and apparatus for the visually impaired provide the visually impaired with the route guidance service in the subway station by using the visible light wireless communication scheme based on the existing illumination device, it eliminates installation of an additional device for providing the information, which can save time, labor, cost, and resources.

DETAILED DESCRIPTION

Hereinafter, at least one embodiment of the present disclosure will be described in detail with reference to the accompanying drawings.

Figure 1:
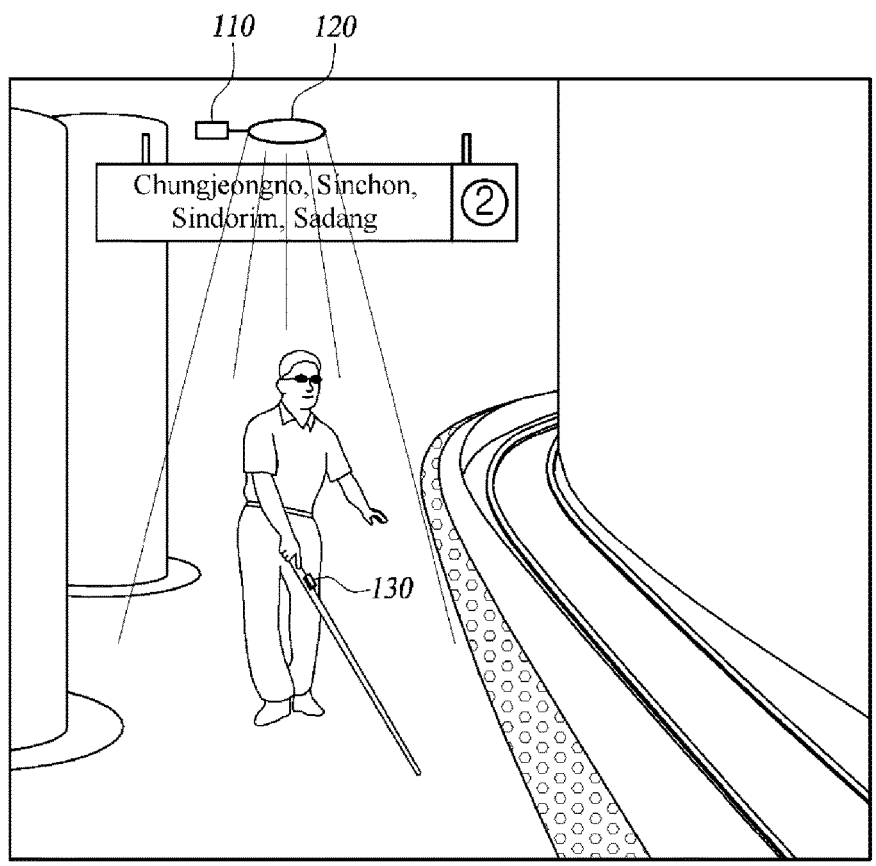
FIG. 1 is a schematic diagram of a route guidance system for a visually impaired according to at least one embodiment of the present disclosure.

FIG. 1 is a schematic diagram of a route guidance system for a visually impaired according to at least one embodiment of the present disclosure. A route guidance system 100 for the visually impaired according to at least one embodiment of the present disclosure is installed in a subway station, and provides a route guidance service to the visually impaired who takes the subway by using a visible light communication.

The route guidance system 100 for the visually impaired shown in FIG. 1 includes a guidance information input device 110, a visible light illumination device 120, and a visually-impaired route guidance apparatus 130. However, the constituent elements included in the route guidance system 100 for the visually impaired are not limited to the above devices. For example, in the route guidance system 100, the guidance information input device 110 and the visible light illumination device 120 can be implemented as one unit instead of being provided as separate units.

The guidance information input device 110 is connected to the visible light illumination device 120, and applies a signal including guidance information to the visible light illumination device 120. That is, the guidance information input device 110 can be provided on a power supply line that is included in the visible light illumination device 120 to supply power for emitting light, and applies the signal including the guidance information to the power supplied to the visible light illumination device 120. In at least one embodiment of the present disclosure, the guidance information input device 110 is connected to the visible light illumination device 120, so that the visible light communication can be easily achieved without changing configurations of existing facilities and the configuration of the visible light illumination device 120 installed in the subway station, which eliminates installation and configuration of additional guidance system, saving resources including time, labor, and cost.

The guidance information input device 110 is connected to an external server in a wired or wireless manner, and receives, from the external server, a guidance information to be provided to the visually-impaired route guidance apparatus 130 by using the visible light illumination device 120. The guidance information includes at least one of current position information, internal information of the subway station, or traffic information corresponding to the subway station. The current position information is provided based on installation coordinates of the visible light illumination device 120 interlocked with the guidance information input device 110, and it may include the name of the subway station where the visually impaired is currently located, information on a current position in the subway station, and the like. The internal information of the subway station includes positional information of facilities in the subway station, such as entrance, exit, transfer, boarding platform, and the like, and route information from the current position to each facility. The traffic information corresponding to the subway station includes information on whether a train approaches the subway station, expected arrival time, direction sign, and the like.

The visible light illumination device 120 transmits light of a visible wavelength region including the guidance information received from the guidance information input device 110 to the guiding device 130. That is, when the visually-impaired route guidance apparatus 130 is detected within an area of the visible light communication, the visible light illumination device 120 transmits, to the route guidance apparatus 130, an optical signal including the guidance information based on the visible light communication. In some embodiments, the visible light illumination device 120 includes, but not limited to, a light emitting diode (LED).

The visible light communication is a technology that employs illumination light, such as light from an LED that emits light from a semiconductor, as a communication light source. The light used in the visible light communication includes visible light in a wavelength of 780 nm to 380 nm, providing illumination and communication at the same time. Therefore, employment of the visible light communication takes advantage of the light normally used for illumination, which does human body no harm, unlike a conventional communication method using various electromagnetic waves, while obviating the need for obtaining a frequency license among other advantages.

The route guidance apparatus 130 is for providing a route guidance service to the visually impaired in a subway station by using the visible light communication. The route guidance apparatus 130 according to at least one embodiment of the present disclosure selectively provides the visually impaired with at least one of the guidance information or a recommended route from the current subway station to a destination such as other subway station, based on the guidance information received from the visible light illumination device 120 and pre-stored route history information. That is, the route guidance apparatus 130 according to at least one embodiment of the present disclosure first confirms information on the visually impaired person's visit to the current subway station based on the guidance information received from the visible light illumination device 120 and the pre-stored route history information, and, based on a result of confirmation, selectively provides the visually impaired with at least one of the recommended route or the guidance information. When the visit information confirms that the visually impaired has visited the current subway station a predetermined number of times or more, the route guidance apparatus 130 analogize a final destination of the visually impaired based on the route history information. Thereafter, the route guidance apparatus 130 generates a recommended route starting from the position where the visually impaired is located and ending at the final destination based on the route history information, and provides the visually impaired with the generated recommended route. A threshold can be set appropriately by a user for the number of visits of the visually impaired to the current subway station so that the threshold is used as a reference for the route guidance apparatus 130 to selectively output at least one of the recommended route or the guidance information.

In general, the visually impaired has a short movement radius compared to sighted people due to the physical condition, and in most cases, the visually impaired makes recurrent visits to the same place rather than a visit to a new place. Further, when visiting the same place, the visually impaired prefers the same travel route based on previous movement experience rather than choosing a new route. The route guidance apparatus 130 according to at least one embodiment of the present disclosure provides the visually impaired with the route guidance service considering such characteristics of the visually impaired. That is, when it is confirmed that the visually impaired has made recurrent visits to a subway station a predetermined number of times or more, the route guidance apparatus 130 determines that the visually impaired wants to move to a frequently visited destination via the current subway station. Thereafter, the route guidance apparatus 130 confirms accumulated routes from the current subway station to the destination within the pre-stored route history information, generates the recommended route from the current subway station to the destination, e.g., an optimum route by analyzing the accumulated routes, and provides the visually impaired with the generated recommended route. Therefore, the visually impaired who carries the route guidance apparatus 130 according to at least one embodiment of the present disclosure can be provided with the necessary realtime information in an efficient manner before arriving at the destination more quickly and safely.

When it is determined based on the visit information that the number of visits of the visually impaired to the current subway station is less than the predetermined number of times, the route guidance apparatus 130 is operative to provide the visually impaired with the guidance information, in order to ensure a safe arrival of the visually impaired at a desired destination. The route guidance apparatus 130 analogize the purpose of the visit of the visually impaired to the subway station based on the current position information included in the guidance information, exclusively re-extracts information corresponding to the analogy result included in the guidance information, and provides the visually impaired with the re-extracted information. That is, when an initial departure is determined to be at a point of boarding the subway based on the current position information included in the guidance information first received at the current subway station, the route guidance apparatus 130 determines that the visually impaired just got off a train at the subway station. Thereafter, the route guidance apparatus 130 filters some irrelevant information from the guidance information received from the visible light illumination device 120, such as whether a train approaches the station, expected arrival time, direction sign, and the like, and provides the visually impaired with the filtered information. With this, the visually impaired who carries the route guidance apparatus 130 according to at least one embodiment of the present disclosure can be provided with necessary information in an efficient manner, and can arrive at the destination more quickly and safely.

The route guidance apparatus 130 according to at least one embodiment of the present disclosure stores and provides the route history information to the visually impaired in the subway station as a route guidance service. In some embodiments, the route history information is directly generated by the route guidance apparatus 130, and in some embodiments, the route history information is provided by a separate computing apparatus (not shown). A detailed description thereof is provided later with reference to FIGS. 2 and 3.

The route guidance apparatus 130 according to at least one embodiment of the present disclosure can be implemented in a form that can be attached to various devices carried by the visually impaired. Although FIG. 1 shows the route guidance apparatus 130 implemented in a form of attachment to a cane carried by the visually impaired, it is a mere example to show that the route guidance apparatus 130 according to at least one embodiment of the present disclosure can be attached to belongings of the visually impaired. For example, the route guidance apparatus 130 can be implemented in a form of attachment to glasses, hat, mobile terminal, and the like carried by the visually impaired.

Figure 2:
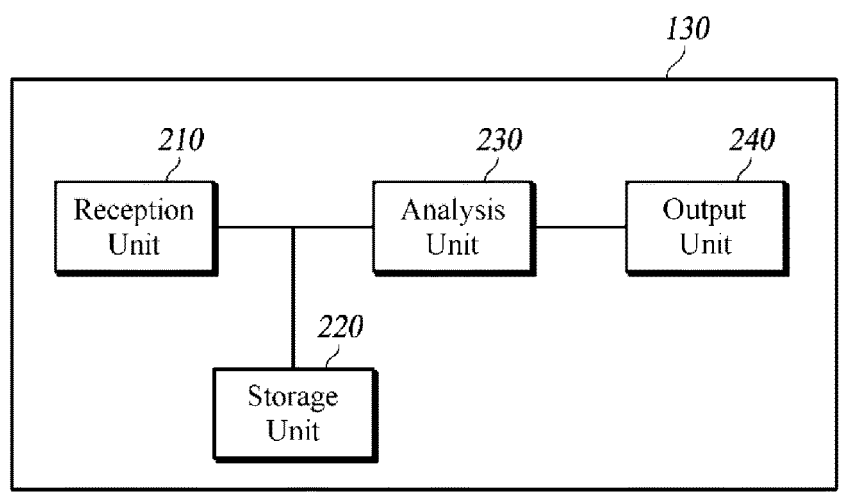
FIG. 2 is a block diagram of the route guidance apparatus for a visually impaired according to at least one embodiment of the present disclosure.

FIG. 2 is a block diagram of the route guidance apparatus for the visually impaired according to at least one embodiment of the present disclosure.

As shown in FIG. 2, the route guidance apparatus 130 according to at least one embodiment of the present disclosure includes a reception unit 210, a storage unit 220, an analysis unit 230, and an output unit 240.

The reception unit 210 receives an optical signal from the visible light illumination device 120 installed in the subway station, extracts the guidance information included in the optical signal, and provides the visually impaired with the extracted guidance information. That is, the reception unit 210 includes a means for detecting the optical signal, e.g., an optical sensor, analyzes the guidance information included in the optical signal, processes the guidance information to generate recognizable information to be provided to the visually impaired. The guidance information is transmitted to the storage unit 220, and stored therein for a predetermined period of time. The guidance information includes at least one of current position information, internal information of the subway station, or traffic information corresponding to the subway station.

When the route history information is externally provided, the reception unit 210 receives the route history information from an external device, and transmits the route history information to the storage unit 220.

The storage unit 220 stores the route history information, and provides the stored route history information to the analysis unit 230, so as to enable the analysis unit 230 to provide the visually impaired with the route guidance service based on the route history information. In some embodiments, the storage unit 220 receives the route history information from the external device, and in some embodiments, the storage unit 220 directly receives the route history information generated by the analysis unit 230. The route history information contains informations previously generated based on a previous travel route of the visually impaired, including departure point information, destination information, information on subway stops between the departure point and the destination, travel information in the subway stops, boarding information, transfer information, and the like.

The analysis unit 230 provides at least one of a recommended route or the guidance information from the current subway station to a specific destination based on the guidance information received from the reception unit 210 and the route history information stored in the storage unit 220. That is, based on the guidance information and the route history information, the analysis unit 230 confirms information on the visits of the visually impaired to the current subway station, and based on a result of confirmation, provides the visually impaired with at least one of the recommended route or the guidance information. In this case, the visiting information of the visually impaired includes information on whether the visually impaired has visited the current subway station before, information on the number of visits, and the like.

The following describes a method of selectively providing at least one of the recommended route or the guidance information by the analysis unit 230 according to the visiting information of the visually impaired with respect to the current subway station, that is confirmed based on the guidance information and the route history information.

When the number of visits of the visually impaired to the subway station is confirmed to be equal to or greater than a predetermined number of times based on the information on the visits of the visually impaired to the current subway station, the analysis unit 230 analogizes a final destination of the visually impaired based on the route history information. That is, when the number of visits of the visually impaired to the current subway station is confirmed to be equal to or greater than a predetermined number of times based on the information on the visits of the visually impaired to the subway station, the analysis unit 230 determines that the visually impaired is to move to a frequently visited destination via the current subway station. The analysis unit 230 analyzes a previous travel route of the visually impaired based on the route history information, whereby extracting information on destinations to which the visually impaired moved through each subway station. Thereafter, the analysis unit 230 aggregates the extracted information on the destinations to analogize the final destination of the visually impaired.

When there is a plurality of final destinations analogized based on the information on the visits of the visually impaired to the subway station and on the route history information, the analysis unit 230 generates one of the plurality of final destinations as the final destination based on at least one of the information on the number of visits to the respective destinations and user-selected information. To this end, the analysis unit 230 informs the visually impaired of the analogized final destinations by using the output unit 240, and receives the user-selected information from the visually impaired through a user interface of the route guidance apparatus 130.

The analysis unit 230 generates a recommended route starting from a point where the visually impaired is located and ending at the final destination based on the information on the final destination and the route history information, and provides the visually impaired person with the generated recommended route. The recommended route includes information on the optimum boarding place for each of subway stations before the visually impaired person's final destination analogized based on the visually impaired person's current location, departing point, travel route, and the like. The analysis unit 230 identifies accumulated routes from the current subway station to the final destination in the pre-stored route history information, analyzes and combines the accumulated routes, and generates the recommended route from the current subway station to the final destination. For instance, the analysis unit 230 analyzes the travel route for each subway station before the visually impaired person's final destination to determine the visually impaired person's travel route right after getting off at a specific subway station, and combines the travel route at the specific subway station with a travel route at the previous subway station to generate an optimum boarding place at the previous subway station. With this operation, the visually impaired who carries the route guidance apparatus 130 according to at least one embodiment of the present disclosure can receive much needed real world information and directional guidance in an efficient manner, and arrive at the destination more quickly and safely.

On the other hand, when it is confirmed that the visually impaired has visited the current subway station less than the predetermined number of times based on the visiting information of the visually impaired with respect to the subway station, the analysis unit 230 provides the visually impaired with the guidance information. The analysis unit 230 then analogizes the purpose of the visually impaired person's visit to the subway station based on the current position information included in the guidance information, re-extracts only such information that is contained in the guidance information and corresponding to the analogy result, and provides the visually impaired with the re-extracted information. A method of analogizing the purpose of the visually impaired person's visit to the subway station by the analysis unit 230 based on the current position information included in the guidance information and a method of re-extracting necessary information only from the guidance information based on the analogy result and providing the visually impaired with the re-extracted information are similar to those described earlier, and therefore a detailed description thereof is omitted.

In some embodiments, the route guidance system 100 for the visually impaired receives the route history information from an external device, and in some embodiments, the route guidance system 100 directly generates the route history information by using the analysis unit 230. That is, the analysis unit 230 generates a travel route for each of subway stations based on the guidance information received from a plurality of visible light illumination devices 120 installed in the subway station and on the intervals between communications with the plurality of visible light illumination devices 120. Thereafter, the analysis unit 230 generates the route history information by summing the respective generated travel routes for the subway stations.

A method of generating the route history information by the analysis unit 230 is described below.

The analysis unit 230 generates the travel route for each subway station based on the guidance information received from the plurality of visible light illumination devices 120 installed in the subway station that the visually impaired user visited and on the intervals between communications with two consecutive ones of the plurality of visible light illumination devices 120. The travel route for each subway station includes information on a departure point for each subway station, destination information, and the travel route from the departure point to the destination.

Based on the interval between consecutive communication events with different visible light illumination devices 120 installed in the subway station that the visually impaired visited, the analysis unit 230 confirms the time interval from when a communication event with a preceding visible light illumination device to when a resumed communication event with the subsequent visible light illumination device. Thereafter, when the time interval between the time of the communication with the preceding visible light illumination device and the time of the resumed communication with the subsequent visible light illumination device exceeds a predetermined threshold, the analysis unit 230 generates the point of the preceding visible light illumination device as the destination information for a subway station, based on the guidance information received from the preceding visible light illumination device. Similarly, when the time interval between the two communication events with the preceding visible light illumination device and with the subsequent visible light illumination device exceeds the predetermined threshold, the analysis unit 230 generates the point of the subsequent visible light illumination device as information on the departure point for a subway station, based on the guidance information received from the subsequent visible light illumination device. It takes a predetermined time for the visually impaired to move by subway from one station to another, during which no visible light communication is performed with a visible light illumination device. Considering this nature, the analysis unit 230 according to at least one embodiment of the present disclosure confirms the time interval to resume the visible light communication with the visible light illumination device, and accordingly generates the departure point and the destination information for each subway station. For instance, the guidance information received from the preceding visible light illumination device may identify the position information as Jamsil station-boarding point No. 4-1, while the guidance information, which is received from the subsequent visible light illumination device that engaged in communicating at a predetermined time or after a time exceeding the predetermined threshold, may identify the position information as Yeoksam station-alighting point No. 4-1, in which case the analysis unit 230 calculates that boarding point No. 4-1 in Jamsil station is its destination information, and that alighting point No. 4-1 in Yeoksam station is its departure point information. In this manner, the analysis unit 230 generates the departure point information and the destination information for each subway station, and finally generating the travel route for each subway station by additionally calculating the travel route from the departure point to the destination based on the guidance information received from the visible light illumination device installed in each subway station.

The threshold for the interval between communication events across the plurality of visible light illumination devices 120, which the analysis unit 230 uses to generate each subway station destination information and information on the departure point, can be set appropriately according to user settings.

When the analysis unit 230 determines, based on the guidance information received from the visible light illumination devices installed in the respective subway stations, that the visually impaired has stopped by a predetermined route-exempt area while moving from the departure point to the destination, it excludes a path corresponding to the route-exempt area from the travel route from the departure point to the destination. The route-exempt area may include a rest room, a convenience store, and the like. That is, the analysis unit 230 enables the visually impaired to arrive at the destination more quickly by excluding paths corresponding to stop-over locations among the travel routes from the departure point to the destination. The analysis unit 230 may store the path corresponding to the route-exempt area at the step of generating the travel route for each subway station for a predetermined time, and thereafter, when the visually impaired is determined to have stopped by the route-exempt area a predetermined number of times or more, the analysis unit 230 may re-include the path corresponding to the route-exempt area in the travel route from the departure point to the destination.

The analysis unit 230 generates the route history information by summing the respective generated travel routes for the subway stations. That is, while adding the respective travel route for the subway stations, the analysis unit 230 determines whether or not the information on the departure point and the destination information included in the travel route for each subway station correspond with the station-boarding point, and generates, based on a result of determination, a departure point and a destination not corresponding with the station-boarding point as an initial departure point and a final destination, respectively, thus finally generating the route history information.

The output unit 240 outputs the recommended path guidance information generated by the analysis unit 230 in a form recognizable by the visually impaired. At this time, the output unit 240 may output the recommended route or guidance information in the form of a sound signal, a tactile signal, a vibration signal, or the like. In the present embodiment, the manner in which the output unit 240 outputs the recommended route or the guidance information is not limited to a specific method.

Figure 3:
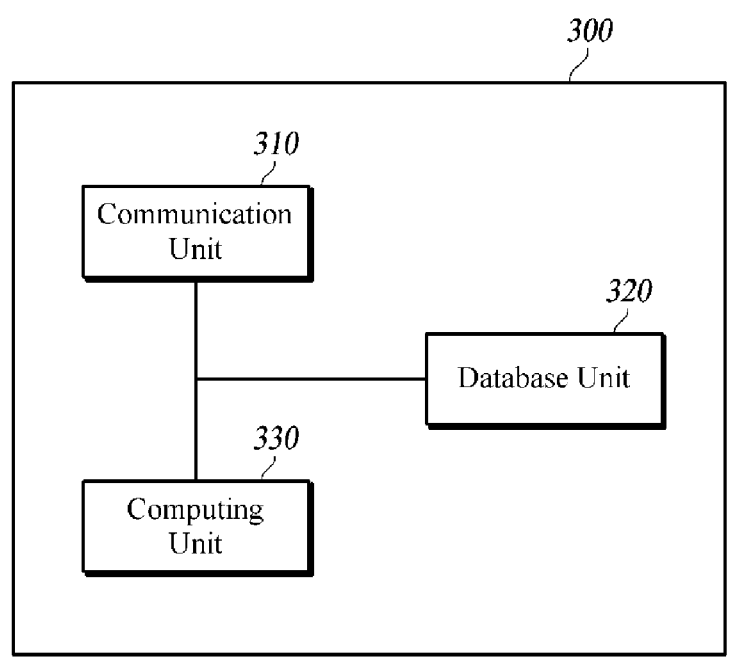
FIG. 3 is a block diagram of a computing apparatus according to at least one embodiment of the present disclosure.

FIG. 3 is a block diagram of a computing apparatus according to at least one embodiment of the present disclosure. Although a computing apparatus 300 is shown as a separate device in FIG. 3, the computing apparatus 300 can be implemented as a constituent element of the route guidance apparatus 130, which is, for example, incorporated in the analysis unit 230.

As shown in FIG. 3, the computing apparatus 300 according to at least one embodiment of the present disclosure includes a communication unit 310, a database unit 320, and a computing unit 330.

The communication unit 310 receives the optical signal including the guidance information from a plurality of visible light illumination devices 120 installed in the subway station. That is, the communication unit 310 includes a means for detecting the optical signal, e.g., an optical sensor, analyzes the guidance information included in the received optical signal, processes the guidance information into recognizable information, and provides the visually impaired with the recognizable information. When the computing apparatus 300 according to at least one embodiment of the present disclosure is implemented in a form incorporated in the route guidance apparatus 130, the function of the communication unit 310 can be replaced by the reception unit 210 of the route guidance apparatus 130.

The communication unit 310 transmits the route history information generated by the database unit 320 to external devices including the route guidance apparatus 130.

The database unit 320 stores information and necessary information generated at the step of generating the route history information. That is, the database unit 320 stores and provides the guidance information received from the plurality of visible light illumination devices 120, the route history information generated by the computing apparatus 300, and the information generated at the step of generating the route history information by the computing unit 330, e.g., the travel route for each subway station and the like.

The computing unit 330 generates the travel route for each subway station based on the guidance information received from the plurality of visible light illumination devices 120 installed in the subway station and on the intervals between the communications with the plurality of visible light illumination devices 120. Thereafter, the computing unit 330 generates the route history information by summing the respective generated travel routes for the subway stations. A method of generating the route history information by the computing unit 330 is similar to the method of generating the route history information by the analysis unit 230, and therefore, a detailed description thereof is omitted.

The computing unit 330 generates the travel route for each subway station with priority based on the guidance information received from the plurality of visible light illumination devices 120 installed in the subway station to which the visually impaired visited and on the intervals between the communications with the plurality of visible light illumination devices 120.

The computing unit 330 confirms the time interval between the time when the communication was performed with the previous visible light illumination device and the time when the communication was resumed with the next visible light illumination device based on the intervals between the communications with the plurality of visible light illumination devices 120 installed in the subway station to which the visually impaired visited. Thereafter, when the interval between the communication time with the previous visible light illumination device and the communication time with the next visible light illumination device exceeds the predetermined threshold, the computing unit 330 generates the point where the previous visible light illumination device is located as the destination information for a subway station based on the guidance information received from the previous visible light illumination device. Similarly, when the interval between the communication time with the previous visible light illumination device and the communication time with the next visible light illumination device exceeds the predetermined threshold, the computing unit 330 generates the point where the next visible light illumination device is located as the departure point information for a subway station based on the guidance information received from the next visible light illumination device.

When it is determined that the visually impaired stops by a predetermined route-exempt area while moving from the departure point to the destination based on the guidance information received from the visible light illumination devices 120 installed in the respective subway stations, the computing unit 330 excludes a path corresponding to the route-exempt area from the travel route from the departure point to the destination. The computing unit 330 stores the path corresponding to the route-exempt area at the step of generating the travel route for each subway station for a predetermined time, and thereafter, when it is determined that the visually impaired stops by the route-exempt area for a predetermined number of times or more, re-includes the path corresponding to the route-exempt area in the travel route from the departure point to the destination.

The computing unit 330 generates the route history information by summing the respective generated travel routes for the subway stations. That is, while adding the respective travel route for the subway stations, the computing unit 330 determines whether or not the departure point information and the destination information included in the travel route for each subway station correspond with the station-boarding point, and calculates, based on the determination, that a departure point and a destination not corresponding with the station-boarding point are an initial departure point and a final destination, respectively, thus finally generating the route history information.

Figure 4:
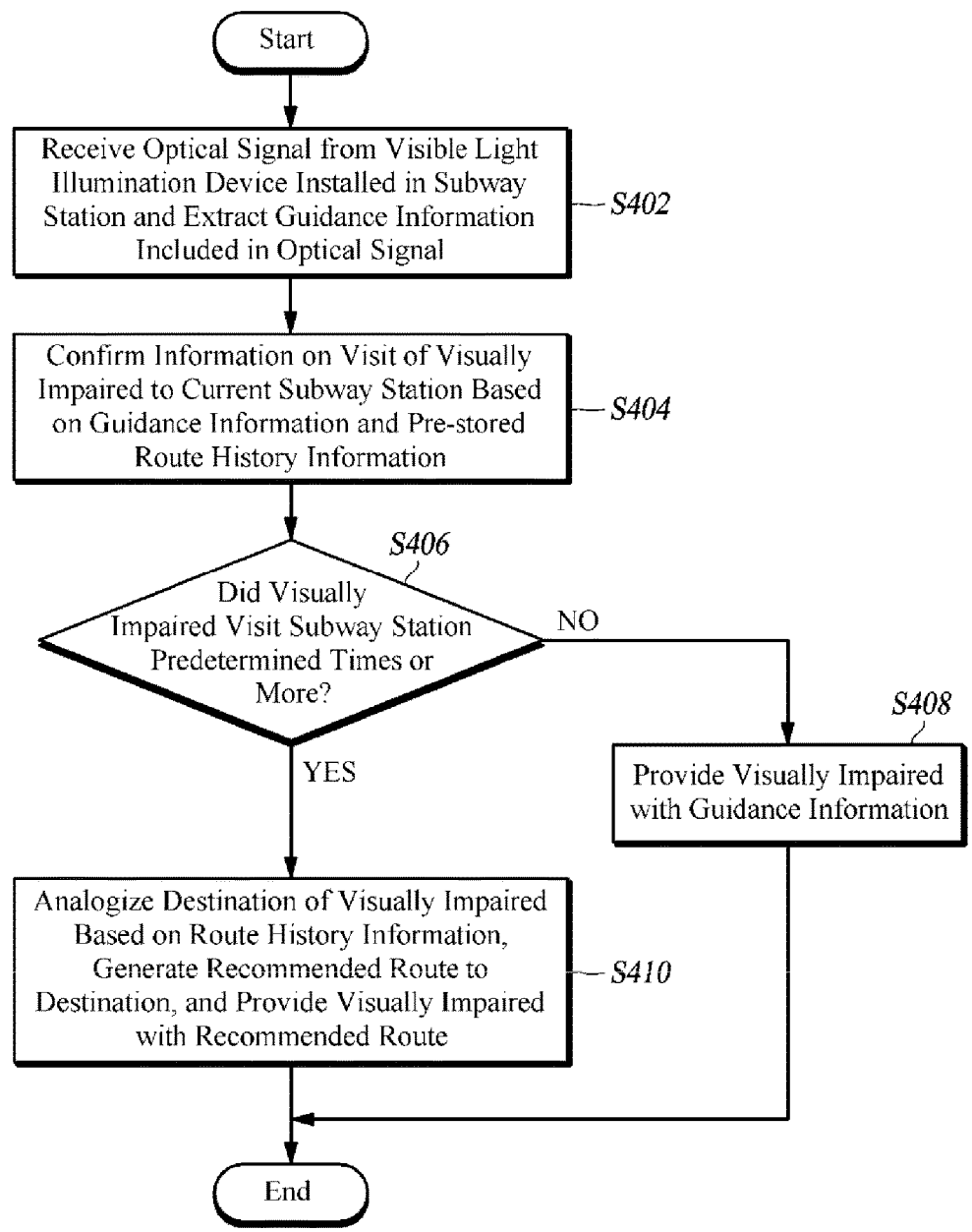
FIG. 4 is a flowchart of a process procedure for implementing a method of guiding a visually impaired in a subway station by using a visible light communication by a route guidance apparatus for the visually impaired according to at least one embodiment of the present disclosure.

FIG. 4 is a flowchart of a process procedure for implementing a method of guiding the visually impaired in a subway station by using a visible light communication by a route guidance apparatus for the visually impaired according to at least one embodiment of the present disclosure.

A method of guiding the visually impaired by the route guidance apparatus 130 according to at least one embodiment of the present disclosure by using the visible light communication begins with the route guidance apparatus 130 receiving an optical signal from the visible light illumination device 120 installed in the subway station and extracting the guidance information included in the optical signal (Step S402). The guidance information extracted at Step S402 includes at least one of current position information, internal information of the subway station, or traffic information corresponding to the subway station.

The route guidance apparatus 130 confirms information on the visually impaired person's visit to the current subway station based on the guidance information and the pre-stored route history information (Step S404). The information on the visually impaired person's visit to the subway station confirmed at Step S404 includes information on whether the visually impaired person has made a previous visit to the current subway station, the number of visits, and the like.

The route guidance apparatus 130 confirms whether or not the number of the visits of the visually impaired to the current subway station is equal to or greater than a predetermined number of times based on the information on visits of the visually impaired to the subway station confirmed at Step S404 (Step S406).

When Step S406 confirms that the number of the visits of the visually impaired to the current subway station is less than the predetermined number of times, the route guidance apparatus 130 provides the visually impaired with the guidance information (Step S408). At Step S408, the route guidance apparatus 130 analogizes the purpose of the visually impaired person's visit to the subway station based on the current position information included in the guidance information, re-extracts information exclusively corresponding to the analogy result included in the guidance information, and provides the visually impaired with the re-extracted information.

When Step S406 confirms that the visually impaired has visited the current subway station a predetermined number of times or more, the route guidance apparatus 130 analogizes a final destination of the visually impaired based on the route history information. Thereafter, the route guidance apparatus 130 generate a recommended route from the current position of the visually impaired to the final destination based on the route history information and provides the visually impaired with the generated recommended route (Step S410). At Step S410, the route guidance apparatus 130 analyzes the previous travel route of the visually impaired based on the route history information, and thereby extracts information on destinations to which the visually impaired has moved through each subway station. Thereafter, the route guidance apparatus 130 analogizes the final destination of the visually impaired by aggregating the extracted information on the destinations.

The route guidance apparatus 130 confirms the accumulated routes from the current subway station to the final destination from the pre-stored route history information, and generates the recommended route from the current subway station to the final destination by analyzing and combining the accumulated routes.

Steps S402 to S410 correspond to the operations of the reception unit 210 and the analysis unit 230, and therefore a further detailed description thereof is omitted.

Figure 5:
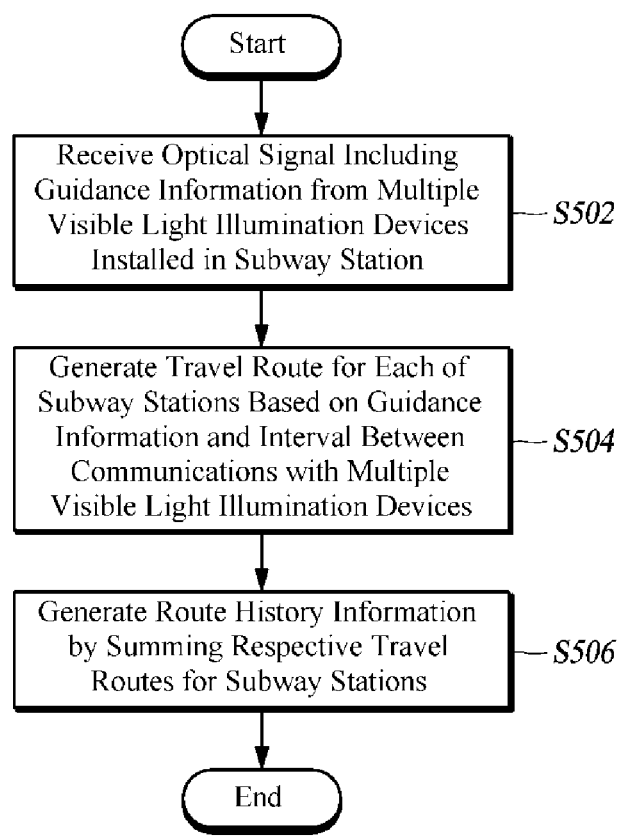
FIG. 5 is a flowchart of a process procedure for implementing a method of generating route history information for guiding a route for a visually impaired in a subway station by a computing apparatus according to at least one embodiment of the present disclosure.
Figure 6A:
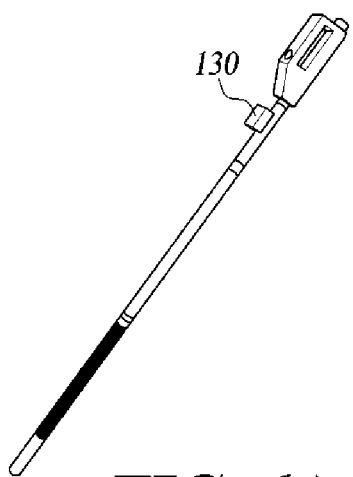
FIG. 6 is a schematic diagram of different implementations of a route guidance apparatus for a visually-impaired, according to some embodiments of the present disclosure.
Figure 6B:
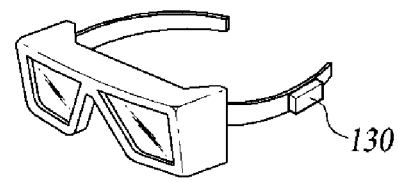
Figure 6C:
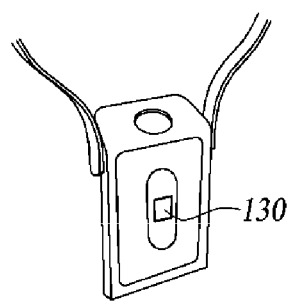
Figure 6D:
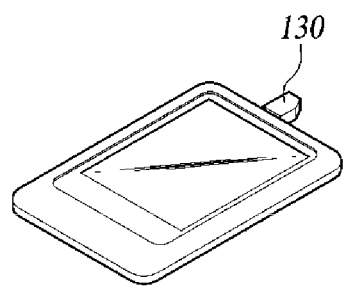

FIG. 5 is a flowchart of a process procedure for implementing a method of generating route history information for guiding a route to a visually impaired in a subway station by a computing apparatus according to at least one embodiment of the present disclosure.

A method of generating the route history information for guiding a route to a visually impaired in a subway station by the computing apparatus 300 according to at least one embodiment of the present disclosure begins with receiving an optical signal including the guidance information from a plurality of visible light illumination devices 120 installed in the subway station by the computing apparatus 300 (Step S502). At Step S502, the computing apparatus 300 analyzes the guidance information included in the received optical signal, processes the guidance information into recognizable information, and provides the visually impaired with the recognizable information.

The computing apparatus 300 generates a travel route for each subway station based on the guidance information received from a plurality of visible light illumination devices 120 installed in the subway station that the visually impaired visited and on intervals between communications with the plurality of visible light illumination devices 120 (Step S504). The travel route for each subway station includes departure point information for each subway station, destination information for each subway station and the travel route from the departure point to the destination. At Step S504, when it is determined, based on the guidance information received from the visible light illumination devices installed in the respective subway stations, that the visually impaired stops by a predetermined route-exempt area while moving from the departure point to the destination, the computing apparatus 300 excludes a path corresponding to the route-exempt area from the travel route from the departure point to the destination. Optionally, the computing apparatus 300 stores the paths corresponding to the route-exempt areas at the step of generating the travel route for each subway station for a predetermined time, and thereafter, when it is determined that the visually impaired stops by the route-exempt area a predetermined number of times or more, re-includes the paths corresponding to the route-exempt areas in the travel route from the departure point to the destination.

The computing apparatus 300 generate the route history information by summing the respective generated travel routes for the subway stations (Step S506). At Step S506, while summing the travel routes for the subway stations, the computing apparatus 300 determines whether or not the departure point information and the destination information included in the travel route for each subway station correspond with the station-boarding point. Thereafter, the computing apparatus 300 generates, based on the determination, that a departure point and a destination not corresponding with the station-boarding point are an initial departure point and a final destination, respectively, thus finally generating the route history information.

Steps S502 to S506 correspond to the aforementioned operations of the communication unit 310 and the computing apparatus 330, and therefore a further detailed description thereof is omitted.

FIG. 6 is a schematic diagram of different implementations of a route guidance apparatus for a visually-impaired, according to some embodiments of the present disclosure.

As shown in FIG. 6 at (a) to (d), the route guidance apparatus 130 according to at least one embodiment of the present disclosure is implemented in a form of attachment to a cane, glasses, an ID card, a terminal, or the like belonging to the visually impaired, but is not limited thereto. For instance, the route guidance apparatus 130 according to at least one embodiment of the present disclosure can be attached to any belongings of the visually impaired so long as the belongings are portable by the visually impaired. Although FIG. 6 from (a) to (d) show that the route guidance apparatus 130 is provided separately from the belongings of the visually impaired, the present disclosure is not limited to this, but the route guidance apparatus 130 can also be included in an element of the belongings of the visually impaired in an integrated manner.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

The invention claimed is:

1. An apparatus for guiding a visually impaired in a subway station by using a visible light communication, the apparatus comprising:
   a reception unit configured to receive an optical signal from a visible light illumination device installed in the subway station and to extract a guidance information included in the optical signal;
   a storage unit configured to store a route history information; and
   an analysis unit configured to provide at least one of the guidance information or a recommended route from the subway station to a destination based on the guidance information and the route history information;
   wherein the analysis unit is configured to confirm an information on visits of the visually impaired to the subway station based on the guidance information and the route history information, and to accordingly provide the visually impaired with at least one of the recommended route or the guidance information; and
   wherein the analysis unit is configured, when the number of the visits of the visually impaired to the subway station is confirmed to be equal to or greater than a predetermined number of times based on the information on the visits of the visually impaired to the subway station, to analogize a final destination of the visually impaired based on the route history information, to generate the recommended route starting from a current location of the visually impaired and ending at the final destination, and to provide the visually impaired with a generated recommended route.

2. The apparatus according to claim 1, wherein the guidance information contains at least one of a current position information, an internal information of the subway station, or a traffic information for the subway station.

3. The apparatus according to claim 1, wherein the route history information contains informations previously generated based on a previous travel route of the visually impaired, including an information on subway stops between a departure point and a destination, a travel information in the subway stops, a boarding information in the subway stops, and a transfer information in in the subway stops.

4. The apparatus according to claim 1, wherein the analysis unit is configured, when there is a plurality of destinations analogized based on the route history information, to determine a destination from among the plurality of destinations as the final destination based on at least one of the number of visits to each of the plurality of destinations or a user-selected information.

5. The apparatus according to claim 1, wherein the analysis unit is configured, when it is confirmed that the number of the visits of the visually impaired to the subway station is confirmed to be less than a predetermined number of times based on information on visit of the visually impaired to the subway station, to provide the visually impaired with the guidance information.

6. The apparatus according to claim 5, wherein the analysis unit is configured to analogize a purpose of visit of the visually impaired to the subway station based on a current position information included in the guidance information, extracts an information contained in the guidance information and corresponding to an analogy result, and to provide the visually impaired with an extracted information.

7. An apparatus for generating a route history information for guiding a route to a visually impaired in a subway station, the apparatus comprising:
a communication unit configured to receive an optical signal including a guidance information from a plurality of visible light illumination devices installed in the subway station; and
a computing unit configured to generate a travel route for each of subway stations based on the guidance information and an interval between communications with the plurality of visible light illumination devices and to generate the route history information by summing respective travel routes for the subway stations;
wherein the computing unit is configured to generate an information on a departure point for each subway station, a destination information, and a travel route from the departure point to the destination based on the guidance information and the interval between the communications and to generate the information on the departure point, the destination information, and the travel route from the departure point to the destination having been generated as the travel route for each subway station; and
wherein the computing unit is configured, when the visually impaired is determined to have stopped by a predetermined route-exempt area based on the guidance information, to exclude a path corresponding to the predetermined route-exempt area from the travel route from the departure point to the destination.

8. The apparatus according to claim 7, wherein the computing unit is configured, when an interval between a communication event with a preceding visible light illumination device and a resumed communication event with a subsequent visible light illumination device is determined to exceed a predetermined threshold based on the interval between the communications, to generate a point of the preceding visible light illumination device as the destination information based on the guidance information received from the preceding guidance information.

9. The apparatus according to claim 8, wherein the computing unit is configured to determine whether or not the information on the departure point and the destination information included in the travel route for each subway station correspond with a station-boarding point and to generate, based on a result of determination, the route history information comprising a departure point and a destination not corresponding with the station-boarding point as an initial departure point and a final destination, respectively.

10. A method of guiding a visually impaired in a subway station by an apparatus for guiding the visually impaired by using a visible light communication, the method comprising:
receiving an optical signal from a visible light illumination device installed in the subway station and extracting a guidance information from the optical signal; and
providing at least one of the guidance information or a recommended route from the subway station to a destination based on the guidance information and a pre-stored route history information; and
analogizing a final destination of the visually impaired based on the route history information, generating the recommended route starting from a current location of the visually impaired and ending at the final destination, and providing the visually impaired with a generated recommended route with an analysis unit when the number of the visits of the visually impaired to the subway station is confirmed to be equal to or greater than a predetermined number of times based on the information on the visits of the visually impaired to the subway station.

11. A method of generating, performed by an apparatus for generating a route history information, the route history information for providing a visually impaired a route guidance in a subway station, the method comprising:
receiving an optical signal including a guidance information from a plurality of visible light illumination devices installed in the subway station;
generating a travel route for each of subway stations based on the guidance information and an interval between communications with the plurality of visible light illumination devices and generating the route history information by summing respective travel routes for the subway stations; and
generating information on a departure point for each subway station, destination information, and a travel route from the departure point to the destination based on the guidance information and the interval between the communications and generating the information on the departure point, the destination information, and the travel route from the departure point to the destination having been generated as the travel route for each subway station with a computing unit;
wherein the computing unit is configured, when an interval between a communication event with a preceding visible light illumination device and a resumed communication event with a subsequent visible light illumination device is determined to exceed a predetermined threshold based on the interval between the communications, to generate a point of the preceding visible light illumination device as the destination information based on the guidance information received from the preceding guidance information.

12. An apparatus for guiding a visually impaired in a subway station by using a visible light communication, the apparatus comprising:
- a reception unit configured to receive an optical signal from a visible light illumination device installed in the subway station and to extract a guidance information included in the optical signal;
- a storage unit configured to store a route history information; and
- an analysis unit configured to provide at least one of the guidance information or a recommended route from the subway station to a destination based on the guidance information and the route history information;
- wherein the analysis unit is configured to confirm an information on visits of the visually impaired to the subway station based on the guidance information and the route history information, and to accordingly provide the visually impaired with at least one of the recommended route or the guidance information; and
- wherein the analysis unit is configured, when it is confirmed that the number of the visits of the visually impaired to the subway station is confirmed to be less than a predetermined number of times based on information on visit of the visually impaired to the subway station, to provide the visually impaired with the guidance information.

* * * * *